(12) United States Patent
Cottrell

(10) Patent No.: US 12,490,002 B2
(45) Date of Patent: Dec. 2, 2025

(54) INTERCOM SYSTEM WITH INTEGRATED AUDIO SYSTEM

(71) Applicant: Rugged Race Products, Inc., Arroyo Grande, CA (US)

(72) Inventor: Greg Cottrell, Arroyo Grande, CA (US)

(73) Assignee: Rugged Race Products, Inc., Arroyo Grande, CA (US)

( * ) Notice: Subject to any disclaimer, the term of this patent is extended or adjusted under 35 U.S.C. 154(b) by 304 days.

(21) Appl. No.: 18/297,256

(22) Filed: Apr. 7, 2023

(65) Prior Publication Data

US 2023/0328411 A1 Oct. 12, 2023

Related U.S. Application Data

(60) Provisional application No. 63/328,674, filed on Apr. 7, 2022.

(51) Int. Cl.
*H04Q 5/24* (2006.01)
*H04B 1/401* (2015.01)

(52) U.S. Cl.
CPC ............. *H04Q 5/24* (2013.01); *H04B 1/401* (2013.01)

(58) Field of Classification Search
CPC ..... H04Q 5/24; H04B 1/401; H04M 2250/02; H04M 1/725; H04M 1/6066; H04M 1/0254
See application file for complete search history.

(56) References Cited

U.S. PATENT DOCUMENTS

| | | | | |
|---|---|---|---|---|
| 5,537,465 A * | 7/1996 | Bellafiore | ............. | H04M 1/715 379/159 |
| 5,991,637 A * | 11/1999 | Mack, II | ............. | H04M 1/6058 455/563 |
| 6,728,517 B2 * | 4/2004 | Sugar | ................... | H04B 1/0057 455/272 |
| 7,502,625 B2 | 3/2009 | Beamish et al. | | |
| 8,565,803 B2 * | 10/2013 | Namm | .................. | H04W 76/45 455/553.1 |
| 2008/0057857 A1 * | 3/2008 | Smith | .................. | H04R 1/1033 455/3.05 |
| 2008/0057858 A1 * | 3/2008 | Smith | .................. | H04R 1/1033 455/3.05 |

(Continued)

OTHER PUBLICATIONS

Ritron Wireless Solutions, "Walkie-Talkie and Two-Way Radio Compatible Receiver," website: https://www.ritron.com/works-with-walkie-talkies-and-two-way-radios, 1 page.

(Continued)

*Primary Examiner* — Akelaw Teshale
(74) *Attorney, Agent, or Firm* — SoCal IP Law Group LLP; Jonathan Pearce

(57) ABSTRACT

There is disclosed a communication device. The communications device includes an audio head unit for generating audio from an audio source, at least one speaker connected to the audio head unit for audibly generating audio provided by the audio head unit, and an intercom system, linked to the audio head unit, for receiving intercom audio for broadcast over one or more a wired or wireless intercom headset, and broadcasting the intercom audio for receipt by the one or more wired or wireless headset.

16 Claims, 4 Drawing Sheets

(56) References Cited

U.S. PATENT DOCUMENTS

| | | | | |
|---|---|---|---|---|
| 2009/0129363 A1* | 5/2009 | Lindsey | ................ | H04R 27/00 |
| | | | | 381/104 |
| 2010/0285750 A1* | 11/2010 | Simonelic | .............. | H04R 5/033 |
| | | | | 381/1 |
| 2011/0211524 A1* | 9/2011 | Holmes | ................... | H04N 7/18 |
| | | | | 370/328 |
| 2015/0319407 A1* | 11/2015 | Frankel | ................. | H04N 7/186 |
| | | | | 348/14.02 |
| 2019/0306639 A1* | 10/2019 | La Groe | ............ | H04M 1/6041 |
| 2022/0377451 A1* | 11/2022 | Shi | ........................ | H04R 1/105 |

OTHER PUBLICATIONS intercoms online.com, "Murs Commercial Wireless Intercom (1 unit)" for sale, webpage: https://www.intercomsonline.com/murs-commercial-wireless-intercom-1unit, 1 page.

wuloo/amazon.com, "Wuloo Wireless Intercom Doorbells for Home Classroom, Intercomunicador Waterproof Electronic Doorbell Chime with 1/2 Mile Range 3 Volume Levels Rechargeable Battery (Black, 1&2)" for sale, webpage https://www.amazon.com/Wuloo-Intercomunicador-Waterproof-Electronic-Rechargeable/dp/B07PLGM93Q/ref=psdc_3180341_12_B09C7HJ21K?th=1, 1 page. Published: Apr. 2, 2019 Publication Location: Amazon.com—https://www.amazon.com/Rugged-Radios-Communications-Intercom-Mounting/dp/B07XWR33C7.†

\* cited by examiner
† cited by third party

INTERCOM SYSTEM WITH INTEGRATED AUDIO SYSTEM

RELATED APPLICATION INFORMATION

This patent claims priority from U.S. provisional patent application No. 63/328,674 entitled "INTERCOM SYSTEM WITH INTEGRATED AUDIO SYSTEM" filed on Apr. 7, 2022.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This invention relates to intercoms and audio communications systems and, more particularly, to a system for enabling access to intercom and audio playback for UTVs audio systems.

Description of the Related Art

Outdoor activities such as dirt biking, UTVing, off-roading, dirt-biking, mountain biking, and others tend to involve individuals acting in spaces that are remote from typical communications networks such as mobile phones or loudspeakers. Many or most of these activities can be dangerous or involve safety risks for accidents or simply because individuals participate in them in inhospitable areas such as deserts or high-altitude mountains or forests. Also, these activities are often strenuous on the individuals involved and on any equipment such as tires, power trains, suspensions, skis, bike frames, and the like. Finally, the motors or engines sometimes involved can generate a great deal of noise, making it difficult to merely speak to individuals riding along with a driver.

As a result, participants in these kinds of activities tend to rely upon intercom systems to communicate locally with riders in the UTVs or other vehicles. This is in particular because without the use of an intercom system, the driver and passengers may not be able to hear one another clearly. And, in some cases, speed and clarity in communication is important for safety of all passengers and the driver. For example, a spotter may notify the driver of an unseen hazard on the course or chosen path or may advise the driver to take a different path. The driver may ask a timely question of the passengers that requires a prompt response and comprehension.

Increasingly, recreational activities of these sorts are family activities. For example, UTVs including both front and back seats have become quite popular and common. In a typical case, a group of families may take out two UTVs for a recreational weekend, with a husband and wife, perhaps a friend of one or both, along with their two children. Friends of their children may join, and another team may join in another UTV as well. Within each UTV, an intercom system is used to communicate. The intercom system typically relies upon a microphone and speaker headset within each rider's helmet. The microphone is used to speak to others in the UTV, while those speaking are heard on the speakers (e.g. a headset) built-into the safety helmet.

Simultaneously, UTVing is primarily done for recreation. So, music is preferably a part of the experience. A typical stereo head unit (or a ruggedized one for the rough-and-tumble activity) is often placed within the "dashboard" of the UTV. Speakers are typically mounted on the roll bars or in the floor boards of the UTV. The phrase "head unit" as used herein means an audio component capable of outputting audio from at least two distinct audio sources selected from the group: AM or FM radio, satellite radio, a cassette tape, a compact disk, a local storage medium within the head unit, a removable storage medium connected to the head unit, a wireless storage medium connected via wireless connection such as 802.11x wireless or Bluetooth®, a remote storage or radio station streamed via wireless connection (e.g. a streaming service like Spotify®), and from a mobile device wired or wirelessly connected to the head unit. The phrase "audio source" as used herein means a place from which audio originates, and expressly includes those listed above but does not exclude other potential audio sources.

Though this application is focused upon UTVs because that is a market addressed by this system, the same or a similar system is equally usable in marine application (e.g. recreational motorboating and boating sports) as well as in off-road vehicles or, when relevant to the particular consumer, on-road vehicles. The present system may be used in dirt biking, mountain biking, and other sports where communication and music may be desirable.

Figure 1:
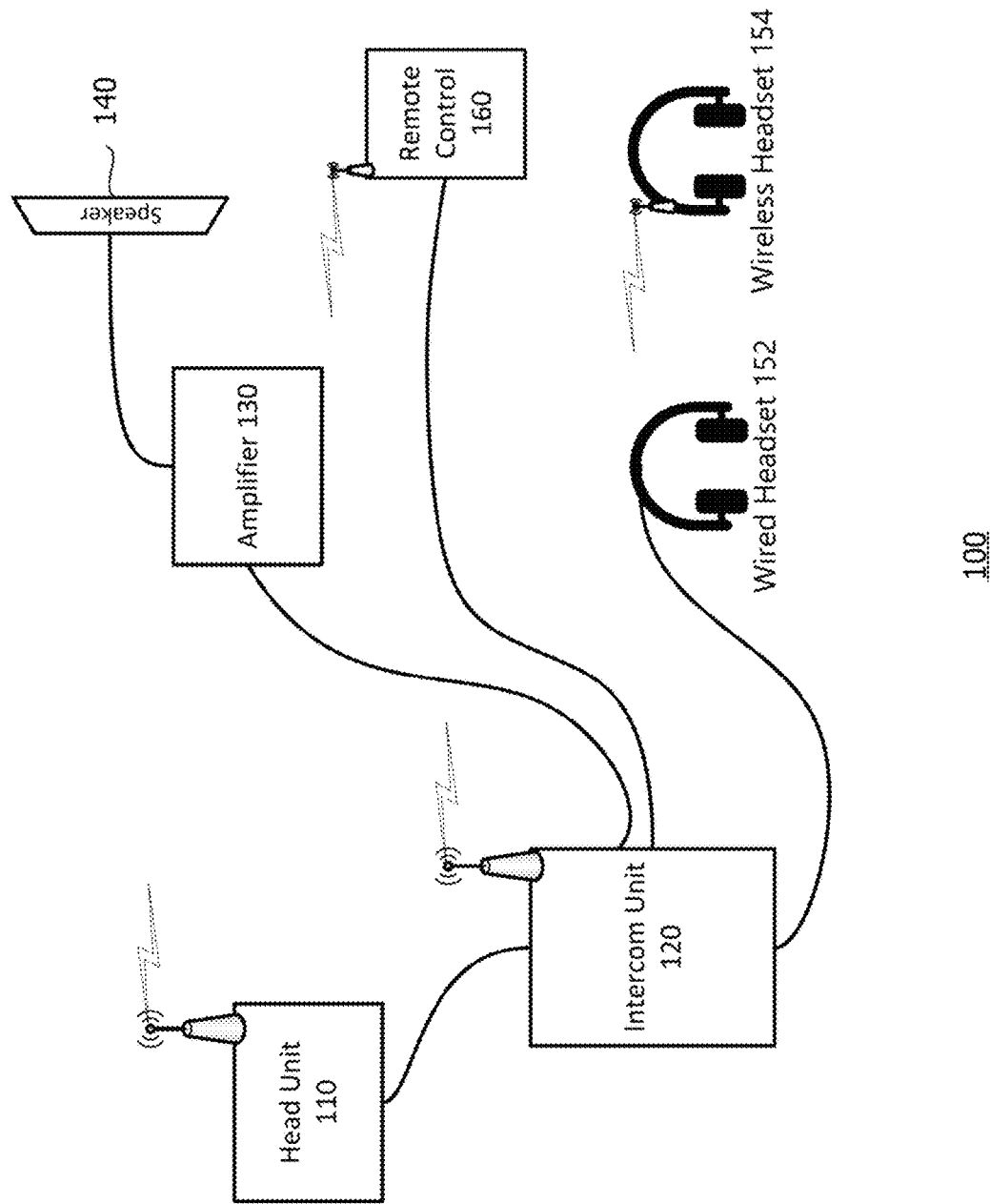
FIG. 1 is a system overview for a communications system.

Throughout this description, elements appearing in figures are assigned three-digit reference designators, where the most significant digit is the figure number and the two least significant digits are specific to the element. An element that is not described in conjunction with a figure may be presumed to have the same characteristics and function as a previously-described element having a reference designator with the same least significant digits.

DETAILED DESCRIPTION

In the past, A UTV owner typically had to choose between having a traditional-style stereo system with loudspeakers (usually ruggedized for harsh environments and lots of jostling caused by UTVing) or an intercom system with integrated 2-way radio, through which users communicate through over-ear headsets with noise-cancelling microphones. In response to this seemingly simple problem, the present system proposes an audio system which enables UTV operators and riders to have both a stereo head unit (for music, podcasts, etc.) and a functional communications intercom for communicating with the passengers as a part of the same, integrated audio system.

The system relies upon the integration of a traditional stereo head unit and reliance upon an independent intercom unit that is not placed in the "dashboard" (e.g. front panel) of a UTV. There is typically insufficient "dashboard" space in a UTV to fit both the integrated intercom system and a traditional stereo. So, the present system relies upon moving the intercom system to a separate location (floor mounted, mounted behind the dashboard, mounted in one of the cargo areas of a UTV or the like) and connecting it to the main or auxiliary output of the stereo head unit.

As many stereo technicians and installers know, many modern head unit stereo systems rely upon separate amplifier systems that are remote from the head unit (e.g. not integrated into the head unit) and connected via a cable to the stereo output line. This intercom system may operate in a similar fashion to be placed in location remote from the stereo head unit. The same stereo output line that is typically used to connect to an amplifier before that amplifier is linked to a speaker system may be used to connect the stereo head unit to an intercom system designed to accept the stereo output signal from the stereo head unit.

The intercom platform may subsequently use a similar connection to provide its signal to the expected amplifier and subsequently to generate audio output signals for use by the speaker(s), left and right.

However, by intercepting the stereo's output signal, the intercom system may passively integrate that signal into its output. It may be designed in such a way that the intercom system does essentially nothing to the incoming output signal from the stereo head unit unless and until such time as a user wishes to use the intercom system to communicate. In the absence of those signals to the intercom system, the intercom system is essentially a passive pass-through to the amplifier and a traditional stereo system amplifier and speakers.

The intercom system may be designed such that it detects interaction with the system (e.g. the pressing of a push-to-talk button or merely speech detection) and interrupts the stereo signal output to inject or even overwrite the stereo signal output to insert the intercom communication. The system may be designed to completely mute or simply lower the volume of the stereo signal during communication by a headset, handset, or other microphone communicating with the intercom system so that the communication may be heard over or instead of the stereo's audio output. The intercom may otherwise act in much the same way as any other intercom system discussed above.

Description of Apparatus

FIG. 1 is a system overview for a communications system 100. The communications system 100 includes a head unit 110, an intercom unit 120, an amplifier 130, a speaker 140, a wired headset 152 and/or a wireless headset 154, and a remote control 160.

The head unit 110 is a "head unit" as defined above. It operates to generate audio signals for listeners in the UTV or other vehicle from an audio source. The head unit relies upon one or more output devices, such as speaker 140 or wired headset 152 to actually output the audio signal as audio. But, the head unit 110 converts the audio source into suitable signals for output as audio or sound.

The intercom unit 120 is an electronic device for capturing audio from a microphone in communication with the intercom unit 120 and converting it into audio signals for transmission to a speaker in communication with the intercom unit 120. Typically, the microphone will be in a wired headset 152 or wireless headset 154, as will the speakers (e.g. as headphones). However, other microphones may be used in some cases such as a handset (as typically used with CB radio) or a handheld wireless "walkie-talkie" style device. Similarly, speakers of various types may be used, including those built into or installed in a UTV, headsets not present in a safety helmet, handheld speakers, or the like.

The intercom unit 120 is shown connected directly to the head unit 110. Preferably, this connection is via a preamplifier audio output intended to provide an audio signal before it is amplified by a secondary audio amplifier and before that signal reaches a speaker or speakers. In this way, the intercom unit 120 may act as a controller for both the audio from the head unit 110 and the audio generated by the intercom unit 120. The intercom unit may selectively drive speakers in headsets or fixed to the UTV as directed and as discussed more fully below. Alternatively, the intercom unit 120 may be connected to an auxiliary audio source, but this may not provide the functionality described herein.

The amplifier 130 is a traditional amplifier intended to boost the audio signal output by the head unit 110 (and potentially the intercom unit 120) so as to drive the speaker 140.

The speaker 140 is shown as a single speaker, but may in fact be two or more speakers. The speaker 140 is preferably a fixed speaker or speaker(s) in the UTV where audio signals from the head unit 110 are output after passing through the intercom unit 120 and the amplifier 130.

Figure 3:
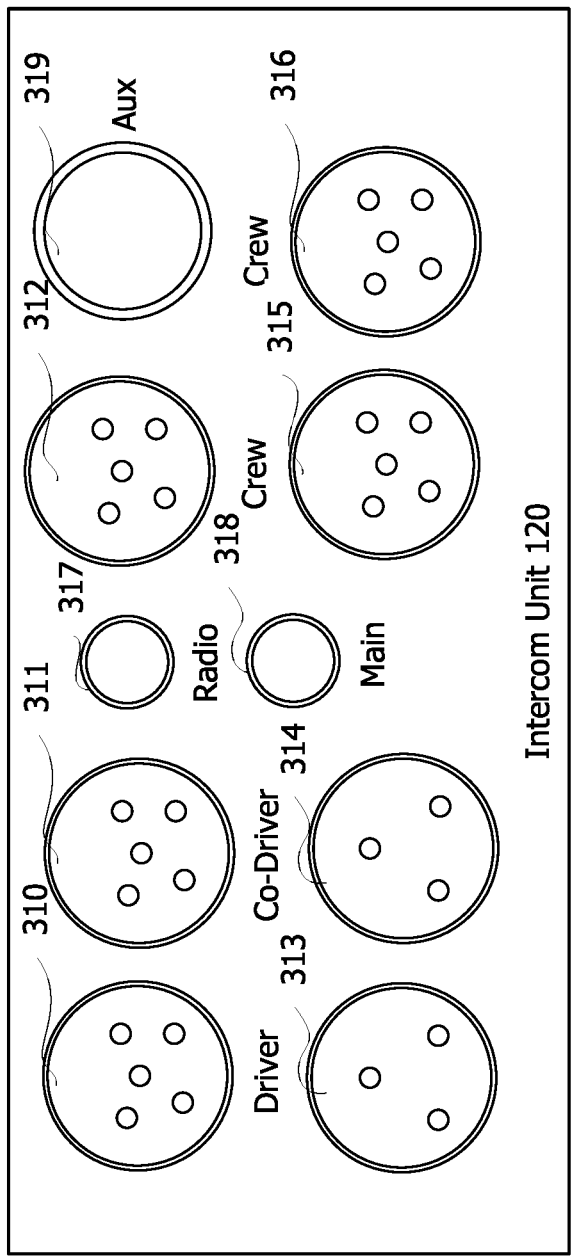
FIG. 3 is an example back design for an intercom unit.

The wired headset 152 is a headset that is physically connected to the intercom unit 120 with a wire. This type of connection is very secure, but many passengers and drivers do not like to have the wire in the way and snaking through the UTV while out UTVing. Nonetheless, the connection is secure, fast, and very reliable, so it is still used in some cases. A typical back of an intercom unit 130 is shown in FIG. 3, where the wired headset 152 may connect. The wired headset 152 typically has at least one microphone and one speaker. However, in some cases, the wired headset 152 may only have speakers for hearing audio, but no microphone for generating audio for the intercom unit 120.

The wireless headset 154 is a headset that is connected to the intercom unit 120 via a wireless connection such as Bluetooth® or other, local-area wireless connectivity (e.g. RF radio). The wireless headset 154 may have only speakers for hearing audio, but no microphone for generating audio for the intercom unit 120. Though, the wireless headset 154 preferably has both. Multiple wired or wireless headsets may be used with the intercom unit 120 simultaneously.

The remote control 160 operates to control the intercom unit 120 as it operates to provide intercom communications with the various connected wireless and wired headsets and to provide (or not provide) audio from the head unit 110.

Figure 2:
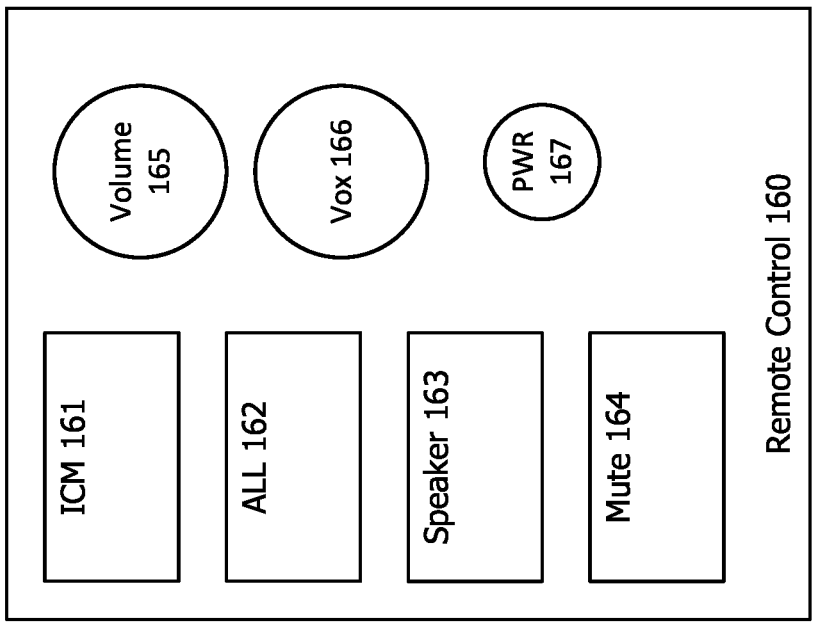
FIG. 2 is an example remote control for a communications system.

FIG. 2 is an example remote control 160 for a communications system. The remote control operates to control the interactions between the intercom unit 120 and the audio head unit 110. In particular, the remote control operates the intercom unit 120, but controls whether or not (and where and how) the audio from the audio unit 110 is heard. The remote control 160 has four functional modes, each represented by a selector button on the remote control 160: ICM button 161, All button 162, Speaker button 163, and Mute button 164. These buttons are mutually-exclusive, meaning pressing one disables all of the others. They are a so-called "radio button" choice among the four options.

The ICM button 161 instructs the intercom unit 120 to play the audio source from the head unit 110 through the intercom system (e.g. the wired and/or wireless headsets connected to the intercom unit 120). The speaker 140 will not generate audio for the audio source. The intercom system itself will operate normally through the wired and/or wireless headsets (or other connected intercom devices as discussed above). In some cases, the music may be muted automatically when intercom communications are detected. Or, the music volume maybe automatically lowered or reduced. Or, the music may continue to play normally. This may be set by hardware or may be a further setting. As discussed below, the vox controller 166 can alter the volume of the intercom communications separately from the audio source.

The All button 162 causes the audio source to generate audio on both the intercom system (e.g. the wired and/or wireless headsets connected to the intercom unit 120) and on any connected speakers, like speaker 140. This typically causes music to be pervasive, coming from every available speaker. The intercom unit 120's intercom communications will only be generated on the connected wired and/or wireless headsets (or other connected intercom devices as discussed above).

The Speaker button 163 causes the audio source to generate audio only on the speaker or speakers, such as speaker 140. The intercom system wired and wireless headsets will be silent, other that upon generation and reproduction of intercom communications.

The Mute button 164 causes the audio source to generate no audio on either the speakers or on any attached wired and/or wireless headsets (or other connected intercom devices as discussed above). The Mute button 164 is useful in a dangerous situation or when communication is key and the audio source audio is making it difficult to hear communications between driver and passengers.

The remote control 160 also has a volume controller 165, a vox controller 166, and a power button 167.

The volume controller 165 alters the volume of the intercom unit audio so that audio on the wired and/or wireless headsets (or other connected intercom devices as discussed above) may be changed for all audio sources currently being output on associated speakers in those devices.

The vox controller 166 adjusts the sensitivity of the voice auto-detection capability for the wired and/or wireless headsets (or other connected intercom devices as discussed above) intended for use as intercom communications. In this way, the user of the remote control 160 can increase or decrease the volume necessary to activate auto-activation of the microphones and reproduction of the participant's voices via the intercom.

The power button 167 turns the intercom system 100 on or off. When off, the intercom system 100 will still function as a pass-through for audio source from the head unit 110. The overall audio system will operate as though the intercom unit 120 is not present.

FIG. 3 is an example back design for an intercom unit 120. The intercom unit 120 includes driver connector 310, co-driver connector 311, driver push-to-talk connector 313, co-driver push-to-talk connector 314, crew connectors 312, 315, and 316, as well as an auxiliary connector 319. The intercom unit 120 includes a radio connector 317 where the intercom unit 120 may connect to the head unit 110 and a main connector 318 where the intercom unit 120 may connect to the amplifier 130. For simplicity, these are shown as individual connectors 317 and 318, but may in fact be several connecters, like of the RCA type. The design shown is merely exemplary of a dash-mounted unit. More or fewer connections may be included in a given communications device.

The driver connector 310 and co-driver connector 311 are combined microphone and speaker connectors for wired connection of headsets or helmet-integral speaker and microphone combinations.

The driver push-to-talk connector 313 and the co-driver push-to-talk connector 314 are connectors for connecting to a push-to-talk toggle or controller that enables the driver and/or co-driver to speak only when the toggle is depressed or otherwise activated.

The crew connectors 312, 315, and 316 are connectors for combined microphone and speakers for wired connection to headsets or helmet-integral speaker and microphone combinations. The crew do not have push-to-talk connectors because they typically do not need them.

An auxiliary connector 319 is provided for service purposes or, for example, for input of music or mobile phone communications from an auxiliary source.

The radio connector 317 may be used to integrate the intercom unit 120 with the head unit 110 which may include the radio transceiver.

The main connector 318 may join the intercom unit 120 to an amplifier to enable the intercom unit 120 to output audio source to speakers.

Description of Processes

Figure 4:
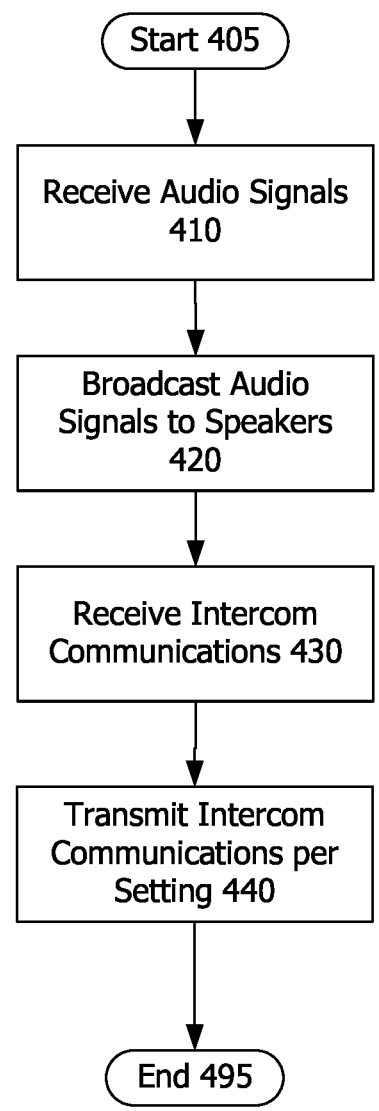
FIG. 4 is a flowchart of a method for use of an intercom system.

FIG. 4 is a flowchart of a method for use of an intercom system. The process begins at start 405 and ends at end 495, but it may take place many times or repeat many times before ending.

Following the start 405, the process begins with receipt of audio signals at 410. Specifically, the audio signals output by the head unit 110 are received by the intercom system 120. Ordinarily, these signals are formed for receipt by an amplifier, like amplifier 130, but the intercom unit 120 is installed between the head unit 110 and the amplifier 130 and receives the signals first. These audio signals are merely the signals generated from the audio source operating on the head unit 110 and are not from an intercom use.

That received audio signal is broadcast to the speakers at 420. The speakers traditionally will be speakers like speaker 140 that is installed or otherwise mounted on the UTV or other vehicle. However, the speakers may be or include speakers in one or more wired and/or wireless headsets, any handsets paired with the intercom system or any other speakers paired with the intercom system.

As discussed above, the remote control 160 may direct where the audio signals from the head unit 110 are directed. Though only four buttons are shown for permutations of audio signals, in particular cases more buttons may be used to direct the audio signals. So, for example, in some cases, passengers may receive audio from the audio source and head unit 110, while driver and spotter devices receive only intercom communications. Or, certain subset(s) of speakers may receive audio, while others only receive intercom communications. Various permutations are available, but at 420, the audio signals are broadcast or output to the speaker (s) selected by a user.

Next, intercom communications are received at 430. These may be received through an open channel type setup where every microphone in ever wired and/or wireless headset is perpetually open channel available for audio to be generated. Or, these may be received through a push-to-talk system whereby a user of one of the wired and/or wireless headsets is required to depress a button to enable speaking into the microphone for capture. More sophisticated systems may use speech detection to differentiate between cabin or motor noise and voices speaking and may only enable voice capture in the wired and/or wireless headsets when a voice is detected. Whatever the system for enabling capture of voice, the intercom unit 120 receives intercom communications at 430.

Thereafter, the intercom communications are transmitted at 440 per the user setting. This means that the intercom communications are captured and prepared for transmission to those participating in the intercom system as directed by the user setting. So, in some cases, those transmissions may be only to the user's wired and/or wireless headsets. In other cases, those transmissions may be alone or in addition to speakers in the UTV or other vehicle. In other cases, those transmissions may be only to a subset (e.g. the driver and/or spotter) as opposed to the entire group using the intercom system. Regardless of how the settings are set, the intercom communication is transmitted per that setting at 440.

The process then ends at 495.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A communication system comprising:
   an audio head unit for generating audio from an audio source, the audio source a selected one of the following: an AM or FM radio transmission, an audio recording, an audio file on a storage device, an audio broadcast streamed via Bluetooth® or the internet to the audio component;
   at least one speaker connected to the audio head unit for audibly generating audio provided by the audio head unit;
   an intercom system, linked to the audio head unit, for receiving intercom audio for broadcast over one or more a wired or wireless intercom headset, and broadcasting the intercom audio for receipt by the one or more wired or wireless headset;
   a mode selector for selecting a mode of operation from a plurality of modes of operation for the intercom audio relative to audio from the audio source;
   wherein a selected mode of operation causes the audio source to output only on the at least one speaker while intercom audio is output only on the one or more wired or wireless headset and the audio source outputs on the at least speaker at a lowered volume when intercom audio is output on the one or more wired or wireless headset.

2. The communication system of claim 1 wherein the intercom system is wired directly into the audio head unit via an output port intended for use by an amplifier for the at least one speaker.

3. The communication system of claim 2 wherein the intercom system is wired between the audio head unit and an amplifier, the amplifier connected to the at least one speaker.

4. The communication system of claim 1 further comprising:
   a remote control for the intercom system including:
   a volume selector for the intercom audio.

5. The communication system of claim 4 wherein:
   the at least one speaker is fixed to a vehicle in which the communication system is mounted; and
   the intercom system is in communication with the one or more wired or wireless headset, each including at least one speaker and at least one microphone, to capture and generate the intercom audio for a user.

6. The communication system of claim 5 wherein the intercom system wherein the intercom system includes at least one of:
   a plurality of wired connections for wired headsets including a microphone and a speaker for capture and output of intercom audio; and
   a Bluetooth® wireless connection for a plurality wireless headsets including a microphone and a speaker for capture and output of intercom audio.

7. A communications device comprising:
   an audio head unit for generating audio from an audio source, the audio source a selected one of the following: an AM or FM radio transmission, an audio recording, an audio file on a storage device, an audio broadcast streamed via Bluetooth® or the internet to the audio component;
   at least one speaker connected to the audio head unit for audibly generating audio provided by the audio head unit;
   an intercom system, linked to the audio head unit between the audio head unit and the at least one speaker using an auxiliary port intended for use by an amplifier, the intercom system for receiving intercom audio for broadcast on an intercom output and outputting the intercom audio on the intercom output;
   a mode selector for selecting a mode of operation from a plurality of modes of operation for the intercom audio relative to audio from the audio source;
   wherein a selected mode of operation causes the audio source to output only on the at least one speaker while intercom audio is output only on the intercom system and the audio source outputs on the at least speaker at a lowered volume when intercom audio is output on the intercom system.

8. The communication system of claim 7 wherein the intercom output is at least a selected one of a wired or wireless headset including at least one speaker and at least one microphone, the at least one speaker for output of intercom audio, the at least one microphone for capture of intercom audio.

9. The communication system of claim 8 wherein:
the at least one speaker is fixed to a vehicle in which the communication system is mounted; and
the intercom output is at least one wired or wireless headset.

10. The communication system of claim 7 further comprising:
a remote control for the intercom system including:
a volume selector for the intercom audio.

11. The communication system of claim 7 wherein the intercom system wherein the intercom output connects to at least one of:
a plurality of wired connections for wired headsets including a microphone and a speaker for capture and output of intercom audio; and
a Bluetooth® wireless connection for wireless headsets including a microphone and a speaker for capture and output of intercom audio.

12. The communication system of claim 7 wherein the intercom output is at least a selected one of a wired or wireless headset including at least one speaker and at least one microphone, the at least one speaker for output of intercom audio, the at least one microphone for capture of intercom audio.

13. A communications device comprising:
an audio head unit for generating audio from an audio source, the audio source a selected one of the following: an AM or FM radio transmission, an audio recording, an audio file on a storage device, an audio broadcast streamed via Bluetooth® or the internet to the audio component;
at least one speaker connected to the audio head unit for audibly generating audio provided by the audio head unit;
an intercom system, linked to the audio head unit between the audio head unit and the at least one speaker using an auxiliary port intended for use by an amplifier, the intercom system for receiving intercom audio for broadcast on an intercom output and outputting the intercom audio on the intercom output;
a control for the intercom system comprising a mode selector for selecting a mode of operation of the intercom audio on the intercom output;
wherein a selected mode of operation causes the audio source to output only on the at least one speaker while intercom audio is output only on the intercom system and the audio source outputs on the at least speaker at a lowered volume when intercom audio is output on the intercom system.

14. The communication system of claim 13 wherein the control comprises a remote control for the intercom system and further includes a volume selector for the intercom audio.

15. The communication system of claim 13 wherein:
the at least one speaker is fixed to a vehicle in which the communication system is mounted; and
the intercom output is at least one wired or wireless headset.

16. The communication system of claim 13 wherein the intercom system wherein the intercom output connects to at least one of:
a plurality of wired connections for wired headsets including a microphone and a speaker for capture and output of intercom audio; and
a Bluetooth® wireless connection for wireless headsets including a microphone and a speaker for capture and output of intercom audio.

* * * * *